United States Patent [19]

Millet et al.

[11] 4,362,855
[45] Dec. 7, 1982

[54] POLYMERIZATION OF POLYSILOXANES

[75] Inventors: Claude Millet, Saint-Priest; Gerard Soula, Meyzieu, both of France

[73] Assignee: Rhone-Poulenc Industries, Paris, France

[21] Appl. No.: 257,711

[22] Filed: Apr. 27, 1981

[30] Foreign Application Priority Data

Apr. 29, 1980 [FR] France .................. 80 10118

[51] Int. Cl.³ .............................. C08G 77/06
[52] U.S. Cl. ........................... 528/14; 528/20; 528/21; 528/33; 528/37; 556/462
[58] Field of Search ............... 528/14, 21, 20, 33, 528/37; 556/462

[56] References Cited

U.S. PATENT DOCUMENTS 3,890,278  6/1975  Lehn et al. ................ 528/14
4,138,543  2/1979  Bargain et al. ............ 556/462
4,254,247  3/1981  Boileau et al. ............ 526/180
4,316,001  2/1982  Boileau et al. ............ 528/14

FOREIGN PATENT DOCUMENTS 2352834  12/1977  France .

Primary Examiner—Melvyn I. Marquis
Attorney, Agent, or Firm—Burns, Doane, Swecker & Mathis

[57] ABSTRACT

High molecular weight organopolysiloxanes, e.g., polydimethylpolysiloxane oils and gums, are facilely and rapidly prepared by polymerizing/rearranging a lower molecular weight organopolysiloxane in the presence of a catalytically effective amount of an alkaline catalyst and a tris-(oxaalkyl)-amine accelerator having the formula (I):

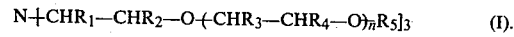

$$N+CHR_1-CHR_2-O+CHR_3-CHR_4-O)_{\overline{n}}R_5]_3 \quad (I).$$

15 Claims, No Drawings

POLYMERIZATION OF POLYSILOXANES

BACKGROUND OF THE INVENTION

1. Field of the Invention

The present invention relates to the preparation of high molecular weight organopolysiloxanes, and, more especially, to the preparation of such high molecular weight organopolysiloxanes by polymerization and rearrangement of low molecular weight organopolysiloxanes in the presence of an alkaline catalyst and an accelerator.

2. Description of the Prior Art

In published French Patent Application No. 2,353,589 (Application No. 76/17,170) there is disclosed a process for the preparation of high molecular weight organopolysiloxanes by the polymerization and rearrangement of cyclosiloxanes, optionally in the presence of low molecular weight, linear polysiloxanes. This process is characterized in that the polymerization reaction is carried out in the absence of solvent and in the presence of a catalyst system consisting of an alkali metal (or derivative thereof) and an oxygen-containing and/or nitrogen-containing mono- or polymacroheterocyclic compound (cryptand or crown ether), which acts as an accelerator. This process makes it possible to obtain a very high molecular weight polysiloxane using very small amounts of the catalyst system and with rapid kinetics. In a process of this type, however, it is necessary to employ macroheterocyclic compounds which have an extremely sophisticated and complex structure and, thus, which exhibit the disadvantages of requiring complex and intricate processes of synthesis and consequently are extremely expensive.

Serious need therefore exists in this art for an industrial process for the preparation of high molecular weight polysiloxanes by the polymerization of low molecular weight organopolysiloxanes, but utilizing an effective catalyst system which is much more readily available industrially.

SUMMARY OF THE INVENTION

Accordingly, a major object of the present invention is the provision of an improved process for the preparation of high molecular weight organopolysiloxanes by the polymerization and rearrangement of lower molecular weight organopolysiloxanes in the presence of a relatively inexpensive and readily commercially available catalyst, said process being characterized in that it is caried out in the conjoint presence of an alkaline catalyst and a tris-(oxaalkyl)-amine having the formula (I):

$$N[CHR_1\text{-}CHR_2\text{-}O(CHR_3\text{-}CHR_4\text{-}O)_n R_5]_3, \quad (I)$$

wherein n is a number greater than or equal to 0 and less than or equal to about 10 ($0 \leq n \leq 10$), $R_1$, $R_2$, $R_3$, $R_4$, which may be identical or different, each represents a hydrogen atom or an alkyl radical having from 1 to 4 carbon atoms and $R_5$ represents a hydrogen atom, an alkyl or cycloalkyl radical having from 1 to 12 carbon atoms, a phenyl radical or a radical of the formula $-C_m H_{2m}\text{-}\phi$, or $C_m H_{2m+1}\text{-}\phi\text{-}$, with m ranging from 1 to about 12 and $\phi$ being phenyl.

DETAILED DESCRIPTION OF THE INVENTION

More particularly according to this invention, in a preferred embodiment a tris-(oxaalkyl)-amine of the formula (I) is used in which $R_1$, $R_2$, $R_3$ and $R_4$ represent a hydrogen atom or a methyl radical, with $R_5$ and n being as above-defined.

Among such tertiary amines, it is even more particularly preferred to use those in which n is greater than or equal to 0 and less than or equal to 3 and in which $R_5$ represents a hydrogen atom or an alkyl radical having from 1 to 4 carbon atoms.

Exemplary of the tris-(oxaalkyl)-amines (I) wherein $R_5$ is hydrogen, i.e., those comprising an hydroxyalkyl function, are:

[1] triethanolamine of the formula:

[2] tris-(3-oxa-5-hydroxypentyl)-amine of the formula:

[3] tris-(3,6-dioxa-8-hydroxyheptyl)-amine of the formula:

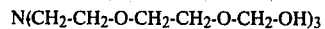

and [4] tris-(2,4-dimethyl-3-oxa-5-hydroxypentyl)-amine of the formula:

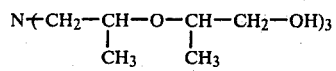

And exemplary of the tris-(oxaalkyl)-amines (I) wherein $R_5$ is alkyl, i.e., those comprising an alkoxy function, are:

[1] tris-(3-oxaheptyl)-amine of the formula:

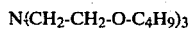

[2] tris-(3,6-dioxaheptyl)-amine of the formula:

$$N(CH_2\text{-}CH_2\text{-}O\text{-}CH_2\text{-}CH_2\text{-}O\text{-}CH_3)_3$$

[3] tris-(3,6,9-trioxadecyl)-amine of the formula:

$$N(CH_2\text{-}CH_2\text{-}O\text{-}CH_2\text{-}CH_2\text{-}O\text{-}CH_2\text{-}CH_2\text{-}O\text{-}CH_3)_3$$

[4] tris-(3,6-dioxaoctyl)-amine of the formula:

$$N(CH_2\text{-}CH_2\text{-}O\text{-}CH_2\text{-}CH_2\text{-}O\text{-}C_2H_5)_3$$

[5] tris-(3,6,9-trioxaundecyl)-amine of the formula:

$$N(CH_2\text{-}CH_2\text{-}O\text{-}CH_2\text{-}CH_2\text{-}O\text{-}CH_2\text{-}CH_2\text{-}O\text{-}C_2H_5)_3$$

[6] tris-(3,6-dioxanonyl)-amine of the formula:

$$N(CH_2\text{-}CH_2\text{-}O\text{-}CH_2\text{-}CH_2\text{-}O\text{-}C_3H_7)_3$$

[7] tris-(3,6,9-trioxadodecyl)-amine of the formula:

$$N(CH_2\text{-}CH_2\text{-}O\text{-}CH_2\text{-}CH_2\text{-}O\text{-}CH_2\text{-}CH_2\text{-}O\text{-}C_3H_7)_3$$

[8] tris-(3,6-dioxadecyl)-amine of the formula:

N(CH$_2$-CH$_2$-O-CH$_2$-CH$_2$-O-C$_4$H$_9$)$_3$

[9] tris-(3,6,9-trioxatridecyl)-amine of the formula:

N(CH$_2$-CH$_2$-O-CH$_2$-CH$_2$-O-CH$_2$-CH$_2$-O-C$_4$H$_9$)$_3$

[10] tris-(3,6-dioxa-4-methylheptyl)-amine of the formula:

$$N{+}CH_2-CH_2-O-\underset{\underset{CH_3}{|}}{CH}-CH_2-O-CH_3)_3$$

and [11] tris(3,6-dioxa-2,4-dimethylheptyl)-amine of the formula:

$$N{+}CH_2-\underset{\underset{CH_3}{|}}{CH}-O-\underset{\underset{CH_3}{|}}{CH}-CH_2-O-CH_3)_3$$

The tris-(oxaalkyl)-amines (I) comprising an hydroxyalkyl function according to this invention are per se well known to the prior art, and are typically prepared in two steps, by first reacting an alkali metal with an alkylene glycol, and thence condensing the resulting salt with a tris-(haloalkyl)-amine.

The tris-(oxaalkyl)-amines (I) comprising an alkoxy function according to the invention are also per se known to the prior art. Thus, French Pat. No. 1,302,365 describes the preparation of the tertiary amines N(CH$_2$-CH$_2$-O-CH$_3$)$_3$ and N(CH$_2$-CH$_2$-O-CH$_2$-CH$_2$-O-CH$_3$)$_3$ as by-products from the synthesis of the corresponding primary and secondary amines, such primary and secondary amines being valuable as intermediates in the synthesis of various pharmaceuticals, as corrosion inhibitors, as intermediates in the synthesis of agricultural chemicals, and as emulsifiers. It will also be appreciated, though, that the prior art, including the aforenoted French Pat. No. 1,302,365, is conspicuously devoid of any suggestion that the topic amines could be utilized in any reaction within the ambit of this invention. Such tris-(oxaalkyl)-amines (I) can also be prepared in two steps, by first reacting an alkali metal with an alkylene glycol monoether, and thence condensing the resulting salt with a tris-(haloalkyl)-amine.

Within the scope of the present invention, there are polymerized and rearranged siloxane compounds consisting of cyclosiloxanes and/or acyclic organopolysiloxanes of low molecular weight.

The polymerizable cyclosiloxanes have the formula (II):

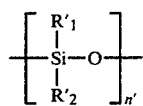
(II)

wherein n' is an integer which is greater than or equal to 3; R'$_1$ is a hydrogen atom, an alkyl, alkenyl, haloalkyl or haloalkenyl radical having from 1 to 5 carbon atoms and optionally containing from 1 to 6 chlorine and/or fluorine atoms, a cycloalkyl or cycloalkenyl radical having from 3 to 8 carbon atoms and being optionally substituted by 1 to 4 chlorine and/or fluorine atoms, a cyanoalkyl radical having from 3 to 4 carbon atoms, or a phenyl, alkylphenyl or phenylalkyl radical having from 6 to 8 carbon atoms, these radicals being optionally substituted by 1 to 4 chlorine and/or fluorine atoms; and R'$_2$ is defined exactly as was R'$_1$ or also can be an alkoxy group —OR'$_3$, with R'$_3$ also being defined as was R'$_1$.

By way of illustration, exemplary of the radicals R'$_1$ are: hydrogen, methyl, ethyl, propyl, isopropyl, butyl, isobutyl, $\alpha$-pentyl, t-butyl, chloromethyl, dichloromethyl, $\alpha$-chloroethyl, $\alpha,\beta$-dichloroethyl, fluoromethyl, difluoromethyl, $\alpha,\beta$-difluoroethyl, 3,3,3-trifluoropropyl, trifluorocyclopropyl, 4,4,4-trifluorobutyl, 3,3,3,4,4,5,5-heptafluoropentyl, $\beta$-cyanoethyl, $\gamma$-cyanopropyl, phenyl, p-chlorophenyl, m-chlorophenyl, 3,5-dichlorophenyl, trichlorophenyl, tetrachlorophenyl, o-, p- or m-tolyl, $\alpha,\alpha,\alpha$-trifluorotolyl, and xylyls, such as 2,3-dimethylphenyl and 3,4-dimethylphenyl.

Preferably, n' is equal to 3 or 4 and R'$_1$ is hydrogen, methyl or vinyl, with the methyl or vinyl radicals optionally substituted by one or two chlorine and/or fluorine atoms, or a phenyl, tolyl or xylyl radical optionally substituted by one or two chlorine and/or fluorine atoms.

In addition to the preferred definitions of the radical R'$_1$, R'$_2$ preferably is hydroxyl or methoxy.

By way of illustration, the following are exemplary of the cyclosiloxanes which are polymerized within the scope of the present invention: hexamethylcyclotrisiloxane (D$_3$), octamethylcyclotetrasiloxane (D$_4$), octaphenylcyclotetrasiloxane, tetramethylcyclotetrasiloxane and tetramethyltetravinylcyclotetrasiloxane.

Most preferably, the cyclosiloxanes polymerized according to the present invention are those consisting of hexamethylcyclotrisiloxane (D$_3$) and/or octamethylcyclotetrasiloxane (D$_4$).

Also within the scope of the present invention, it too is envisaged to polymerize and rearrange siloxane compounds consisting of cyclosiloxanes of the formula (II), in conjunction with acyclic organopolysiloxanes of low molecular weight and being either linear, branched or cross-linked in nature.

These organopolysiloxanes, having in general at most 200 silicon atoms per mole, the nature of which is not critical, consist of units having the general formula (III):

$(R'_1)_xSiO_{(4-x)/2}$ (III), optionally also comprising units of the formula (IV):

$(R'_1)_y(R'_2)_zSiO_{(4-y-z)/2}$ (IV), wherein R'$_1$ is hydrogen, an alkyl, alkenyl, haloalkyl or haloalkenyl radical having from 1 to 5 carbon atoms and optionally containing from 1 to 6 chlorine and/or fluorine atoms, a cycloalkyl or cycloalkenyl radical having from 3 to 8 carbon atoms and being optionally substituted by 1 to 4 chlorine and/or fluorine atoms, a cyanoalkyl radical having from 3 to 4 carbon atoms, or a phenyl, alkylphenyl or phenylalkyl radical having from 6 to 8 carbon atoms, these radicals being optionally substituted by 1 to 4 chlorine and/or fluorine atoms; R'$_2$ is defined exactly as was R'$_1$ or also can be an alkoxy group —OR'$_3$, with R'$_3$ also being defined as was R'$_1$; x and y are each integers equal to 0, 1, 2 or 3; and z is an integer which is less than or equal to 2.

Preferably, the siloxane compounds to be polymerized, which consist of a mixture of cyclosiloxanes and acyclic organopolysiloxanes, contain at least 50% by weight of cyclosiloxanes. In this context, it is advantageous to polymerize mixtures containing at least 50% of D₃ and/or D₄, the remainder consisting of a linear organopolysiloxane "M₂D$_p$" having the formula (V):

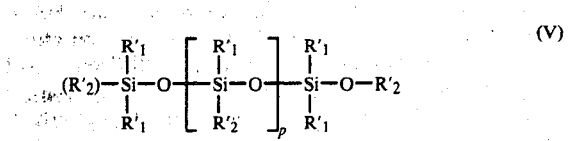

wherein p is an integer ranging from 1 to 100; and $R'_1$ and $R'_2$ are defined exactly as they were above, respecting the cyclosiloxanes.

The following are exemplary of the organosiloxanes of low molecular weight and linear in structure: hexamethyldisiloxane, tetramethyldivinyldisiloxane, α,ω-dihydroxypolydimethylpolysiloxanes, α,ω-bis-hydroxydimethylsilylpolydimethylpolysiloxanes, α,ω-dimethoxy-polydimethylpolysiloxanes, tetraphenyldisiloxanediol and α,ω-dihydrogenopolydimethylpolysiloxanes.

It too is within the scope of the present invention to polymerize and rearrange the linear or branched chain, acyclic organopolysiloxanes as defined above.

It should also be appreciated that it is also within the scope of the invention to include in the polymerization recipe with the organosiloxanes to be polymerized and rearranged, as defined above, a small amount, for example, representing up to 20% by weight, of a silane bearing one or more alkoxy groups, such as, for example, methyltriethoxysilane, vinyl-tris(methoxyethoxy)-silane or phenyltriethoxysilane.

In the catalyst system, the alkaline catalyst component consists of an alkali metal or alkaline earth metal or of any known derivative of these metals, such as, for example, those recommended for the polymerization of low molecular weight polysiloxanes (compare, for example, Noll, *Chemistry and Technology of Silicones*, 1968 Edition, page 227). It is envisaged, in particular, to use the hydroxides, the amides, the alcoholates, the siliconates, the silanolates, and the like. Lithium, sodium, potassium, rubidium and cesium, and also their corresponding derivatives, are preferably used. Most preferably, lithium, potassium, sodium, or derivatives thereof are used.

The system for catalyzing the polycondensation reaction according to this invention can be used in widely varying proportions and amounts. Such is most notable because of the fact that it can be used in very small amounts. Normally, from 0.1 to 1,000 mg, and preferably from 1 to 100 mg, of alklai metal hydroxide equivalent or alkaline earth metal hydroxide equivalent are used per kg of polysiloxane to be polymerized and rearranged. The hydroxide equivalent for any alkali metal derivative or alkaline earth metal derivative is expressed as the weight of the amount of the metal hydroxide which would have to be added and which would correspond to the same number of gram atoms of alkali metal or alkaline earth metal as that of the alkali metal derivative or alkaline earth metal derivative used.

The molar ratio tris-(oxaalkyl)-amine/alkali metal hydroxide equivalent or alkaline earth metal hydroxide equivalent advantageously ranges from 0.01 to 100 and preferably from 0.1 to 50.

The process according to the invention can be carried out by simple heating at a temperature between 80° and 200° C. and preferably between 80° and 180° C. The polymerization and the rearrangement can also be carried out in a solvent medium or non-solvent medium. If it is decided to use a solvent, same will be selected from among those solvents which can be used for the polymerization of cyclosiloxanes; the following are exemplary: benzene, toluene, THF, dioxane, and the like.

The process according to the invention is preferably carried out in a non-solvent medium. A very substantial time saving results, for a given degree of conversion, compared with the polymerization time obtained when using solely the same amount of alkaline catalyst.

The technique described immediately above is of considerable value in the polymerization of siloxanes on an industrial scale, using a continuous or discontinuous process.

In particular, same enables the preparation of organosilicon oils or organosilicon gums of the methyl, methylvinyl, methylphenyl or other type, which form a portion of compositions which, after cross-linking in air or under the action of heat, in the presence of the customary fillers and ingredients, yield organosilicon elastomers possessing excellent mechanical properties.

In order to further illustrate the present invention and the advantages thereof, the following specific examples are given, it being understood that same are intended only as illustrative and in nowise limitative.

EXAMPLES 1,000 g of octamethylcyclotetrasiloxane (D₄), 1.35 g of tetradecamethylhexasiloxane (M₂D₄) and a variable amount of tris-(oxaalkyl)-amine were introduced into a 2 liter stainless steel reactor fitted with a stirrer. The mixture was heated to 160° and, when this temperature had been reached, the alkaline catalyst (1% strength solution of potassium silanolate in D₄) was introduced. The polymer yield was then determined as a function of time and compared with a control experiment in which no tris-(oxaalkyl)-amine was present.

The Tables which follow reflect the operating conditions and the polymer yields.

TABLE I

| Example | M₂D₄ in g | Alkaline Catalyst Expressed in mg of KOH/kg of Siloxane | Tris-(Oxaalkyl)-Amine Nature | Amount in mg/kg |
|---|---|---|---|---|
| 1 | 1.35 | 9.4 | None | 0 |
| 2 | 1.38 | 10 | N[(CH₂—CH₂O)₂H]₃ | 58.4 |
| 3 | 1.32 | 10.3 | N[(CH₂—CH₂O)₂H]₃ | 1,490 |
| 4 | 1.32 | 9.9 | N[(CH₂—CH₂O)₃H]₃ | 56.4 |
| 5 | 1.32 | 9.4 | N[(CH₂—CH₂O)₃H]₃ | 94.4 |
| 6 | | 9.1 | N[(CH₂—CH₂O)₃C₂H₅]₃ | 1,090 |

TABLE II

| Example | Yield of Polymer With Variable Polymerization Times | | | | |
|---|---|---|---|---|---|
| | 5' | 10' | 15' | 30' | 45' |
| 1 | 7 | 14 | 20 | 40 | 60 |
| 2 | 28 | 40 | 50 | > 80 | |
| 3 | | | > 90 | | |
| 4 | | | | 66 | |
| 5 | 20 | 33 | 43 | 65 | 80 |
| 6 | | | | 68 | |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for the preparation of high molecular weight organopolysiloxanes by the catalyzed polymerization and rearrangement of lower molecular weight organopolysiloxanes, the improvement which comprises conducting said process in the presence of a catalytically effective amount of an alkali metal catalyst or an alkaline earth metal catalyst, and a tris-(oxaalkyl)-amine accelerator having the formula (I):

$$N[CHR_1\text{-}CHR_2\text{-}O(CHR_3\text{-}CHR_4\text{-}O)_{\overline{n}}R_5]_3 \qquad (I)$$

wherein n is a number greater than or equal to 0 and less than or equal to 10; $R_1$, $R_2$, $R_3$, $R_4$, which may be identical or different, each represents a hydrogen atom or an alkyl radical having from 1 to 4 carbon atoms; and $R_5$ represents a hydrogen atom, an alkyl or cycloalkyl radical having up to 12 carbon atoms, a phenyl radical or a radical of the formula $-C_mH_{2m}\text{-}\phi$, or $C_mH_{2m+1}\text{-}\phi\text{-}$, with m ranging from 1 to 12 and $\phi$ being phenyl.

2. The process as defined by claim 1, wherein the tris-(oxaalkyl)-amine, $R_1$, $R_2$, $R_3$ and $R_4$ are each hydrogen or methyl.

3. The process as defined by claim 2, wherein the tris-(oxaalkyl)-amine, n is 3 or less and $R_5$ is hydrogen or an alkyl radical having from 1 to 4 carbon atoms.

4. The process is defined by claim 1, 2 or 3, said lower molecular weight organopolysiloxane polymerized/rearranged comprising a cyclosiloxane having the formula (II):

$$\left[\begin{array}{c} R'_1 \\ | \\ Si\text{-}O \\ | \\ R'_2 \end{array}\right]_{n'} \qquad (II)$$

wherein n' is an integer of at least 3; $R'_1$ is a hydrogen atom, an alkyl or alkenyl radical having up to 5 carbon atoms and being unsubstituted or substituted with from 1 to 6 chlorine and/or fluorine atoms, a cycloalkyl or cyloalkenyl radical having from 3 to 8 carbon atoms and being unsubstituted or substituted with from 1 to 4 chlorine and/or fluorine atoms, a cyanoalkyl radical having from 3 to 4 carbon atoms, or a phenyl, alkylphenyl or phenylalkyl radical having up to 8 carbon atoms and being unsubstituted or substituted with from 1 to 4 chlorine and/or fluorine atoms; and $R'_2$ is $R'_1$ or an alkoxy group $-OR'_3$, with $R'_3$ also being $R'_1$.

5. The process as defined by claim 1, 2 or 3, said lower molecular weight organopolysiloxane polymerized/rearranged comprising a cyclosiloxane having the formula (II):

$$\left[\begin{array}{c} R'_1 \\ | \\ Si\text{-}O \\ | \\ R'_2 \end{array}\right]_{n'} \qquad (II)$$

conjointly with an organopolysiloxane having the formula (III):

$$(R'_1)_x SiO_{(4-x)/2} \qquad (III)$$

wherein n' is an integer of at least 3; $R'_1$ is a hydrogen atom, an alkyl or alkenyl radical having up to 5 carbon atoms and being unsubstituted or substituted with from 1 to 6 chlorine and/or fluorine atoms, a cycloalkyl or cycloalkenyl radical having from 3 to 8 carbon atoms and being unsubstituted or substituted with from 1 to 4 chlorine and/or fluorine atoms, a cyanoalkyl radical having from 3 to 4 carbon atoms, or a phenyl, alkylphenyl or phenylalkyl radical having up to 8 carbon atoms and being unsubstituted or substituted with from 1 to 4 chlorine and/or fluorine atoms; $R'_2$ is $R'_1$ or an alkoxy group $-OR'_3$, with $R'_3$ also being $R'_1$; and x is 0, 1, 2 or 3.

6. The process as defined by claim 5, the polymerization/rearrangement recipe further comprising a comonomer having the formula (IV):

$$(R'_1)_y(R'_2)_z SiO_{(4-y-z)/2} \qquad (IV)$$

wherein y is 0, 1, 2 or 3, and z is an integer which is 2 or less.

7. The process as defined by claim 5, said lower molecular weight organopolysiloxane polymerized/rearranged comprising at least 50% but less than 100% of hexamethylcyclotrisiloxane and/or octamethylcyclotetrasiloxane, with the remaining comonomer being a linear organopolysiloxane having the formula (V):

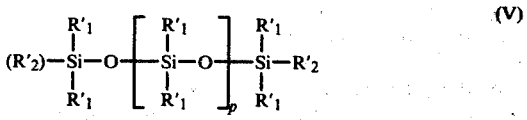

wherein p is an integer ranging from 1 to 100; and $R'_1$ and $R'_2$ have the same definitions as in the comonomers (II).

8. The process as defined by claim 1, the same being carried out in the absence of solvent.

9. The process as defined by claim 4, the same being carried out in the absence of solvent.

10. The process as defined by claim 5, the same being carried out in the absence of solvent.

11. The process as defined by claim 6, the same being carried out in the absence of solvent.

12. The process as defined by claim 7, the same being carried out in the absence of solvent.

13. The process as defined by claim 1, said tris-(oxaalkyl)-amine being triethanolamine, tris-(3-oxa-5-hydroxypentyl)-amine, tris-(3,6-dioxa-8-hydroxyheptyl)-amine, tris-(2,4-dimethyl-3-oxa-5-hydroxypentyl)-amine, tris-(3-oxaheptyl)-amine, tris-(3,6-dioxaheptyl)-amine, tris-(3,6,9-trioxadecyl)-amine, tris-(3,6-dioxaoctyl)-amine, tris-(3,6,9-trioxaundecyl)-amine, tris-(3,6-dioxanonyl)-amine, tris-(3,6,9-trioxadodecyl)-amine, tris-(3,6-dioxadecyl)-amine, tris-(3,6,9-trioxatridecyl)-amine, tris-(3,6-dioxa-4-methylheptyl)-amine, and tris-(3,6-dioxa-2,4-dimethylheptyl)-amine.

14. The process as defined by claim 1, wherein the metal catalyst is an alkali metal, an alkaline earth metal, or a hydroxide, amide, alcoholate, siliconate or silanolate of an alkali metal or alkaline earth metal.

15. The process as defined by claim 14, wherein the metal catalyst is lithium, sodium, potassium, rubidium, or cesium or a hydroxide, amide, alcoholate, siliconate, or silanolate thereof.

* * * * *